US006092008A

United States Patent [19]

Bateman

[11] Patent Number: 6,092,008

[45] Date of Patent: Jul. 18, 2000

[54] FLIGHT EVENT RECORD SYSTEM

[76] Inventor: Wesley H. Bateman, 3016 Lillis Ave., Las Vegas, Nev. 89030

[21] Appl. No.: 08/873,985

[22] Filed: Jun. 13, 1997

[51] Int. Cl.[7] ........................................................ G06F 7/70

[52] U.S. Cl. ................................ 701/14; 701/13; 701/35; 342/357.01; 342/455; 244/158 R; 244/17.13

[58] Field of Search ................................ 701/13, 14, 35, 701/15, 16; 342/357, 455, 356, 357.01; 455/12.1, 3.2, 5.1, 13.1, 13.2; 244/158 R, 75 R, 17.13

[56] References Cited

U.S. PATENT DOCUMENTS

| | | | |
|---|---|---|---|
| 3,564,134 | 2/1971 | Rue . | |
| 4,510,803 | 4/1985 | Perara | 73/178 R |
| 4,660,145 | 4/1987 | Hansen | 701/14 |
| 4,729,102 | 3/1988 | Miller, Jr. et al. | 701/14 |
| 4,816,828 | 3/1989 | Feher . | |
| 4,825,457 | 4/1989 | Lebowitz . | |
| 4,970,648 | 11/1990 | Capots . | |
| 5,382,943 | 1/1995 | Tanaka . | |
| 5,406,324 | 4/1995 | Roth . | |
| 5,467,274 | 11/1995 | Vax | 701/14 |
| 5,493,309 | 2/1996 | Bjornholt | 342/455 |
| 5,504,491 | 4/1996 | Chapman . | |
| 5,508,736 | 4/1996 | Cooper . | |
| 5,508,922 | 4/1996 | Clavelloux et al. . | |
| 5,587,904 | 12/1996 | Ben-Yair et al. . | |
| 5,594,545 | 1/1997 | Saito et al. . | |
| 5,798,458 | 8/1998 | Monroe | 73/587 |

*Primary Examiner*—William A. Cuchlinski, Jr.
*Assistant Examiner*—Gertrude Arthur
*Attorney, Agent, or Firm*—Christie, Parker & Hale, LLP

[57] ABSTRACT

An in-flight event recording system for acquiring data related to an aircraft, its physical condition and functioning, its altitude, position and speed, direction of travel, and any unusual events. The in-flight event recording system processes and stores the data and is able to continuously transmit the data to ground based receiving and storage installations.

17 Claims, 3 Drawing Sheets

FLIGHT EVENT RECORD SYSTEM

FIELD OF THE INVENTION

This invention relates to aircraft, and more specifically, to an aircraft flight recording systems.

BACKGROUND OF THE INVENTION

As airplane travel becomes more frequent, many aviation experts believe that accidents will also become more commonplace. Many think 1996, in which 1840 people died in airline crashes worldwide, may have signaled the beginning of just such a trend. The National Transportation Safety Board's (NTSB) present approach of dealing with accidents by sifting through wreckage and methodically taking steps to make sure it does not happen again has long been criticized by some industry observers as placing too little emphasis on pro-active prevention measures.

In the United States the responsibility for solving airline disasters falls to the NTSB. A comparatively tiny federal agency, the NTSB is charged by the Congress of the United States with investigating not just every civil aviation accident in the nation, but also railroad, highway, marine, and pipeline disasters. Although it has no enforcement powers, the agency is called upon to issue safety recommendations aimed at preventing future accidents. Since its inception in 1967, the NTSB has investigated more than 100,000 aviation accidents and thousands of surface transportation accidents, and has issued nearly 10,000 safety recommendations.

A brief review of the complexity and uncertainty of investigating aircraft crashes will illustrate the need for more complete and readily available flight event records.

Local emergency crews are usually the first to reach a crash scene, and they generally concentrate on rescuing survivors. Once the NTSB is notified of the crash, the agency dispatches a "go team" of six to ten staff investigators to the scene. At the crash site, each investigator is assigned to oversee and direct a group of experts drawn from each of the parties involved in the investigation, including the aircraft manufacturer, the engine maker, the airline, and union representatives of the flight crew.

Each investigative team is assigned a particular task, such as retrieving and identifying wreckage material. Wreckage retrieval can take days or weeks, followed by reconstruction and analysis of airplane parts or sections if investigators believe the wreckage holds clues. Investigators plot the locations of main wreckage areas as the first step in a painstaking process of keeping track of where each piece of debris is found at the scene. Investigators also fan out to interview air traffic control. Autopsies of the victims also are routinely conducted. Teams check maintenance records to research what role, if any, ground and flight crew missteps may have played in the accident. Other areas of investigation include weather conditions, air traffic control records, and engine systems. The NTSB investigators moderate group discussions about how to interpret evidence and take the lead in drawing up findings and safety recommendations.

Two crucial storehouses of evidence are the cockpit voice recorder (CVR) and the flight data recorder (FDR). The CVR captures the pilots' conversations as well as ambient cockpit sounds on a continuous loop of tape that recycles itself every 30 minutes. The FDR registers engine performance as well as changes in the jet's speed and position and runs on a 25-hour loop. The devices are designed to survive fiery crashes and are equipped with battery-powered transmitters that give off a "pinging" locator signal if they are submerged under water.

While the cockpit voice recorder (CVR) and the flight data recorder (FDR) do work, they have one major problem. When investigating a crash, it is necessary for investigators to scour hundreds of square miles to retrieve debris, which is used to reconstruct, to the extent possible, the aircraft as an aid in determining the cause of the crash. The present invention will aid and significantly reduce the time it takes when investigating an aircraft accident.

The background technology necessary to carry out the present invention is readily available; however, the inventive concept has not been suggested.

For example, global navigational systems are well known. Such systems are described and standards set forth in the RTCA Task Force Report on Global Navigation Satellite System (GNSS) Transition and Implementation Strategy that is available from the FAA. This report includes, for example, RTCA DO-202, Report of SC-159 on Minimum Aviation System Performance Standards (MASPS) for GPS, Nov. 28, 1988; RTCA DO-208, Minimum Operational Performance Standards for Airborne Supplemental Navigation Equipment Using GPS, Jul. 12, 1991; RTCA DO-229, Minimum Operational Performance Standards for Global Positioning System/Wide Area Augmentation System Airborne Equipment, Jan. 16, 1996; RTCA Task Force Report on Global Navigation Satellite System (GNSS) Transition and Implementation Strategy, Sep. 18, 1992.

Looking to the future, Motorola's IRIDIUM global communications system and Lockheed Martin's Astrolink global communication satellite system will provide broad arrays of digital positioning and communications services, including voice, data, and video.

Communications systems between aircraft and GNSS and GCS systems are commercially available. For example, Pelorus Navigation Systems Inc. of Calgary, Alberta, Canada, offers its Pelorus Precision Distance Measuring Equipment for co-location with microwave landing systems and fully compliant Local Area Differential Global Navigational Satellite Systems for Special Category I precision approach landings. The Pelorus system uses differential GPS technology to provide aircraft with corrections to raw GPS to enable safe, accurate and reliable use of satellite signals for all weather navigation.

Signal compression is also a well-developed technology in which several companies offer commercial products suitable for use in the present invention. Dedicated signal conditioners (DSC) convert digital and analog data signals received from the various sensors to a usable form. Signal conditioning provides the multiplexer with compatible inputs. The DSCs provide input from transducer signals, such as frequency, voltage, current, pressure, temperature (variable resistance and thermocouple), displacement (potentiometer), 28 or 5 volt dc discrete output signals, analog and digital level changes, polarity changes or an ac signal change to a dc signal. The DSCs send these converted signals to the appropriate Multiplexer DeMultiplexers (MDM) and to a monitoring system of choice. MDMs can operate in two ways. As multiplexers, they take data from several sources, convert the data to serial digital signals (a digitized representation of the applied voltage) and interleave the data into a single data stream. As demultiplexers, the MDMs take interleaved serial digital information; separate and convert it to analog, discrete or serial digital; and send each separate signal to its appropriate destination where it can be stored or monitored in real time.

Video-still visual monitoring systems are readily available. As an example, the 2611 MainStreet Video Termination Unit (VTU), Video Display Unit (VDU) and ViaNet Video Management System (VMS) together provide a scaleable video-over-network system. The 2611 MainStreet VTU is a stand-alone unit which compresses video data for efficient transmission. It receives video data from one of four camera inputs (PAL or NTSC), compresses the data to 64 kbit/s or 128 kbit/s data streams. The ViaNet VMS is a remote monitoring and surveillance system, optimized for the capture, transmission, viewing and storage of video images. ViaNet decompresses the video data stream to both VGA and PAL/NTSC composite video for quality image monitoring, and offers an option for digital back-up, multiple alarm configurations and pan-tilt-zoom (PTZ) camera control.

By way of a further example, Ultrak sells closed-circuit television (CCTV) and related products in the United States. CCTV is a system of relaying video and audio signals from a camera to a monitor and/or to a recording device. The term CCTV refers to a closed circuit sending signals to one or a few select receivers as opposed to a signal that is broadcast to the general public. Products manufactured and sold by Ultrak include CCD cameras, lenses, high-speed dome systems, monitors, switchers, quad processors, time-lapse recorders, multiplexers, wireless video transmission systems, computerized observation and security systems, and accessories.

Flight recorders of different technical capability levels are available. State-of-the-art FDRs, used widely by airlines in Europe and Japan, for example, monitor hundreds of airplane functions. Minimum standards for flight data recorders have been proposed. For example, each flight recorder must be installed so that:

(1) It is supplied with accurate airspeed, altitude, and directional data.

(2) The vertical acceleration sensor is rigidly attached, and located longitudinally either within the approved airplane, or at a distance forward or aft of these limits that does not exceed 25 percent of the airplane's mean aerodynamic chord.

(3) It receives its electrical power from the bus that provides the maximum reliability for operation of the flight recorder without jeopardizing service to essential or emergency loads.

(4) There is an aural or visual means for pre-flight checking of the recorder for proper recording of data in the storage medium.

(5) Except for recorders powered solely by the engine-driven electrical generator system, there is an automatic means to simultaneously stop a recorder that has a data erasure feature and prevent each erasure feature from functioning.

(6) Has an underwater locating device.

The underlying technology for placing the present invention in operation is described in abundant patent literature of which the following are only exemplary.

Flight recorders are described in U.S. Pat. No. 4,510,803 (Perara) which discloses a flight recorder system; U.S. Pat. No. 4,970,648 (Capots) which discloses a high performance flight recorder; and U.S. Pat. No. 5,508,922 (Clavelloux, et. al.,) which discloses flight recorders with static electronics memory.

Global positioning systems are described in U.S. Pat. No. 5,504,491 (Chapman) which describes a global status and position reporting system for a remote unit having a status and position transmit/receive unit with at least one status and/or event input connected to a respective status and/or event sensor for reporting at least one system status and/or event and position of the remote unit, and a status output connected to a communication interface. The base unit, disposed at a position spaced away from the remote unit, is adapted for receiving a status and position report. Position independent communications means include communications interfaces respectively disposed in the remote unit and in the base unit for transmitting a status and position report from the remote unit to the base unit upon receipt of an activating prompt from the status sensor or a prompt initiated at the base unit. A global positioning satellite receiver is provided in the remote unit for receiving global positioning information from a system of global positioning satellites having a position output connected to the communication means for entering position information upon receiving the activating prompt.

Another global positioning system is described in U.S. Pat. No. 5,594,545 (Devereux, et. al.,) that discloses a small, multi-function device called the GPS/Telemetry Transmitter (GTT) that can recover telemetry (TM) data from missiles, spacecraft, balloons, or any moving platform or vehicle, and generate high accuracy trajectory estimates using GPS data. The concept underlying the GTT of transmitting high-data-rate telemetry and instrument data concurrently with trans-digitized GPS data is incorporated in a GPS-Linked Transponder (GLT) resulting in a simpler and cheaper satellite positioning system.

A sophisticated positioning system is described by Ben-Yair et. al., in U.S. Pat. No. 5,587,904.

Visual monitoring systems are described in U.S. Pat. No. 3,564,134 (Rue); U.S. Pat. No. 4,816,828 (Feher); U.S. Pat. No. 5,508,736 (Cooper); U.S. Pat. No. 5,382,943 (Tanaka); and U.S. Pat. No. 5,406,324 (Roth). Particular reference is made to Feher, U.S. Pat. No. 4,816,828 which teaches an aircraft visual monitoring system and illustrates proper placement of cameras in and on the aircraft, and monitor, recording and telemetry systems for handling data from the cameras.

The present invention can, optionally, utilize conventional digital cellular telephone systems for communicating signals to and from satellites and earth stations. An exemplary cellular network data transmission system is disclosed in U.S. Pat. No. 4,825,457.

It is an object of the present invention to utilize known technology to provide a reliable system for obtaining, recording, and utilizing aircraft in-flight data in real time on the ground and in the aircraft and storing such data for use in analyzing flight characteristics or patterns, unusual flight events and in seeking the cause of aircraft crashes.

SUMMARY OF THE INVENTION

A flight event record system and method are disclosed which records in-flight information at ground based installations during the flight of an aircraft and which permits ground based personnel to monitor in real time or at a later time the flight of the aircraft.

The system comprises several diverse components in data communication with each other. A flight event record monitor unit is installed on an aircraft the performance and location of which is to be monitored. Means are provided on the aircraft for generating positioning data defining the geographical position of the aircraft, for generating data uniquely identifying the aircraft, for generating data defining the performance of the aircraft, for generating data defining the physical condition of the aircraft, and for generating data defining the activity of the crew of the aircraft. Means are provided on the aircraft, in the preferred embodiment of the invention, for defining normal activity and condition levels of performance data, physical condition data and crew activity data and for generating alert signal data if any of the performance data, physical condition data or crew activity data fall outside the normal activity and condition levels of performance data, physical condition data and crew activity data. The system includes at least one ground based data receiving station for receiving in-flight event data from the aircraft and communication means for transmitting to the ground based data receiving station the alert signal data and data from the flight event record monitor unit to the receiving station defining the geographic location of the aircraft, the identity of the aircraft, and data defining the physical condition and performance and crew activity of the aircraft. Means are provided at a ground storage unit in communication with the data receiving station for storing the transmitted data at least until the aircraft has completed the flight with respect to which data is being transmitted. Optionally, the system includes means for activating the communication means only upon the generation of alert signal data.

In a preferred embodiment, flight event record system comprises in data communication with each other, a global positioning satellite system, a flight event record monitor unit installed on an aircraft the performance and location of which is to be monitored, a global positioning satellite system receiver/transmitter installed on the aircraft for generating positioning data defining the geographical position of the aircraft, means on the aircraft in data communication with the flight event record monitor for generating data uniquely identifying the aircraft, at least one ground based data receiving station for receiving in-flight event data from the aircraft, communication means for transmitting to the ground based data receiving station data from the flight event record monitor unit to the receiving station defining the geographic location of the aircraft, the identity of the aircraft, and data defining the physical condition and performance of the aircraft, and means on the ground in communication with the data receiving station for storing the transmitted data at least until the aircraft has completed the flight with respect to which data is being transmitted.

The system may also include means on the ground for monitoring in real time the data transmitted from the flight event record monitor unit on the aircraft.

In a preferred embodiment, the system includes at least one camera mounted to generate images of exterior portions of the aircraft, means for transmitting the images to the flight event record monitor unit and from the flight event record monitor unit to the data receiving station and/or at least one camera mounted to generate images of interior portions of the aircraft, means for transmitting the images to the flight event record monitor unit and from the flight event record monitor unit to the data receiving station.

The system may further comprise a changing flight data system installed on the aircraft for continuously receiving and monitoring data defining the physical condition and performance of the aircraft and generating an alert signal upon changes in the data in excess of a predetermined data threshold and means responsive to the alert signal for transmitting the alert signal and changed flight data to the data receiving station.

The communication system may include global communication satellites, telemetry systems or cellular telephone systems, or any combination of these systems.

The invention is also embodied in method for recording in-flight data from an aircraft. As a method, the following steps may be included. Substantially continuously generating on the aircraft from a global navigational satellite system data defining the geographic location of the aircraft and transmitting the geographic location data to a ground based data receiving and storage installation, generating data defining performance of the aircraft and transmitting the performance data to the ground based data receiving and storage installation, generating image data defining the physical condition of the aircraft and transmitting the image data to the ground based data receiving and storage installation, and storing all of the aforesaid data at the ground based storage installation at least until the aircraft has completed the flight with respect to which such data is generated. The method may include the step of monitoring on the ground in real time the data received from the aircraft.

In a preferred method, the steps include substantially continuously generating on the aircraft from a global navigational satellite system data defining the geographic location of the aircraft and transmitting the geographic location data to a ground based data receiving and storage installation, substantially continuously generating data defining performance of the aircraft, substantially continuously generating image data defining the physical condition of the aircraft, substantially continuously generating data defining the activity of the crew of the aircraft, establishing a normal operating data range for the performance data, physical condition data and crew activity data, generating alert signal data in response to there being generated either performance data, physical condition data or crew activity data outside the normal operating data range and transmitting the alert signal data, performance data, physical condition data and crew activity data to a ground based data receiving and storage installation and storing the aforesaid data at the ground based storage installation at least until the aircraft has completed the flight with respect to which such data is generated.

In a still more preferred method, the steps are substantially continuously generating on the aircraft from a global navigational satellite system data defining the geographic location of the aircraft and transmitting the geographic location data to a ground based data receiving and storage installation, substantially continuously generating data defining performance of the aircraft, substantially continuously generating image data defining the physical condition of the aircraft, substantially continuously generating data defining the activity of the crew of the aircraft, establishing a normal operating data range for the performance data, physical condition data and crew activity data, generating alert signal data in response to there being generated either performance data, physical condition data or crew activity data outside the normal operating data range, and, transmitting in response to the generation of the alert signal the performance data, physical condition data, alert signal data, and crew activity data to a ground based data receiving and storage installation and storing the aforesaid data at the ground based storage installation at least until the aircraft has completed the flight with respect to which such data is generated. As in the other methods, this method may include the step of monitoring on the ground in real time the data received from the aircraft.

The foregoing and other objects, features, and advantages of the invention will be apparent from the following, more particular, description of the preferred embodiments of the invention, as illustrated in the accompanying drawings.

In all drawings, the communication lines permit two-way communication between the connected modules unless otherwise indicated. Communication lines may be hard wired, where possible, or radio or telemetry, induction coupling, short range UHF communications, etc.

DESCRIPTION OF THE PREFERRED EMBODIMENTS

It will be clear from the foregoing and from the following description that the system of this invention can use any of a great many kinds of individual modules, equipment and systems within the system and method of the invention and that the specific equipment, etc., are not limiting of the invention.

Figure 1:
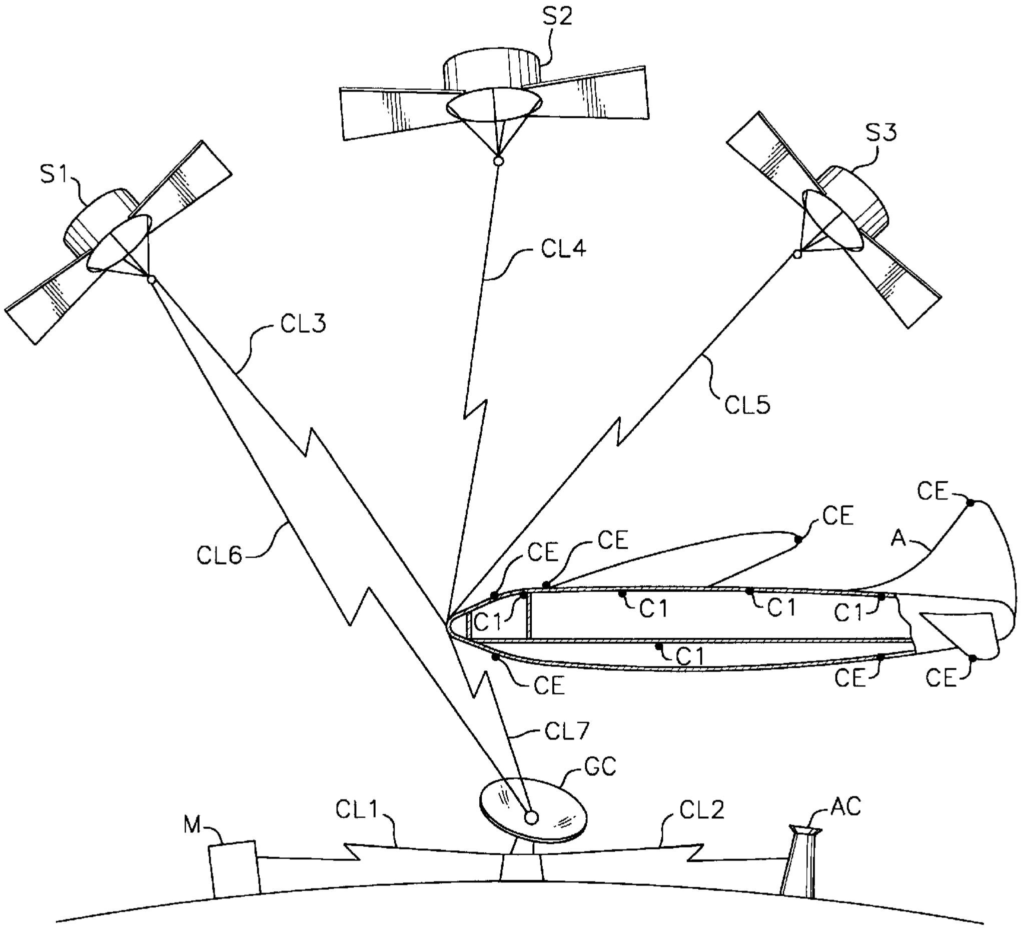
FIG. 1 is a simplified schematic depiction of the major components of the Flight Event Recording System (F.E.R.S.) of the present invention.

Referring now to FIG. 1, it will be seen that the major components of the F.E.R.S. system include Global Positioning and Global Communications Satellites S1, S2 and S3, at least one ground communication station GC connected to a monitoring and/or recording station M by a communications link CL1, and optionally connected to an aircraft controlling station AC by a communications link CL2. The satellites are in communication with the F.E.R.S. components on the aircraft A through communication links CL3, CL4 and CL5, which also communicate with the ground receiving station GC through communication links, one of which is indicated at CL6. The aircraft communicates through a communication link CL7 through which data that define the operating parameters, location and physical condition of the aircraft are transmitted to ground receiving stations for off-aircraft storage and/or ground based monitoring. The aircraft A is equipped with a plurality of cameras, include cameras CE that view portions of the exterior of the aircraft and cameras CI that view interior compartments of the aircraft.

Figure 2:
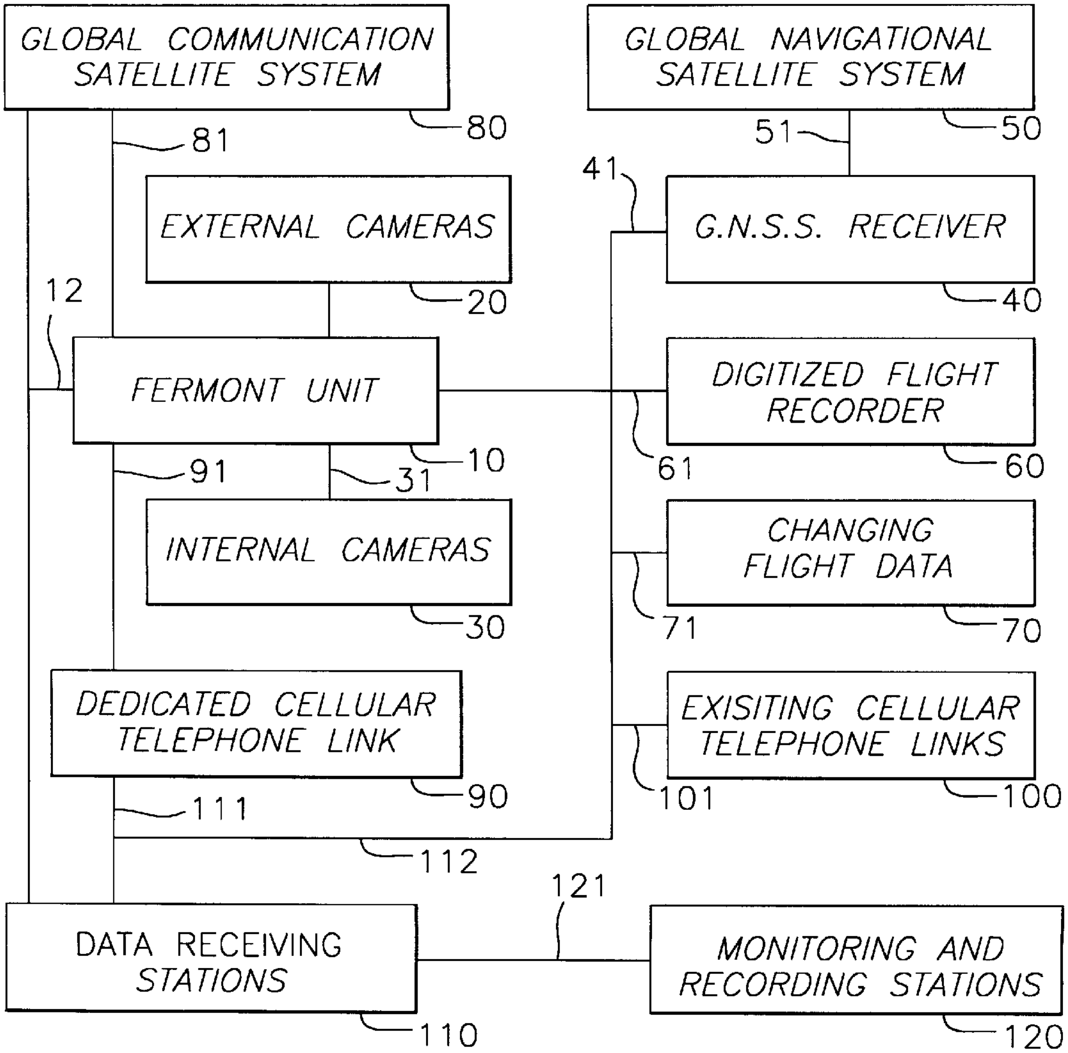
FIG. 2 is a functional block diagram showing the functional units of the present invention.

Referring now to FIG. 2, which is a functional block diagram of the F.E.R.S. of this invention, the interfacing of the Flight Event Recording Monitor (hereinafter FERMONT) with the other components of the system and the function of the F.E.R.S. and FERMONT are described.

The basic unit of the F.E.R.S. is the FERMONT unit 10, the functions of which are described above. The FERMONT unit 10 is in communication through a communication channel 11 with sources of data which are processes, compressed and transmitted to ground receiving stations directly or through communications satellites through communication channel 12. Data from external cameras 20 and from internal cameras 31 are sent by communication channels 21 and 31 respectively to the FERMONT unit 10 where the image data is processed. Positional data from a G.N.S.S. receiver 40 are sent through communication channel 41 to the FERMONT unit 10; such data being generated through communication links 51 with a global navigational satellite system 50.

Digitized flight recorder data is sent to the FERMONT unit 10 from the digitized flight recorder 60 through communication channel 61 and changing flight data is sent from the changing flight data generator 70 through communication channel 71.

Data is communicated between the FERMONT unit 10 and the Global communication satellite system 80 through communications links 81 and between the FERMONT unit 10 and ground based data receiving stations 110 via the global communication satellite system 80 and communications links 81 and 12, and/or through a dedicated cellular telephone link 90 and communications link 91 and/or through existing cellular telephone links through communication channels 11, 101, 112 and 111. The ground receiving station 110 may process, store and monitor the data and/or forward it through communication link 121 to additional monitoring and recording stations 120.

The Global Navigational Satellite System (G.N.S.S.) 50 utilizes a number of satellites, S1, S2 and S3 (FIG. 1), for example, deployed in various orbits about the Earth. These satellites electronically triangulate the longitude and latitude of aircraft, ships, and other moving objects located somewhere beneath them. In the case of aircraft, these satellites also provide information pertaining to altitude.

The position of the aircraft is determined by way of the G.N.S.S. receiver 40 and the G.N.S.S. 50. The receiver 40 comprises a transmitter/receiver that permits two way communication between the G.N.S.S. 50 and the aircraft.

An aircraft's G.N.S.S transmitter/receiver 40 is interfaced with the FERMONT unit 10 as described. The same "position data" that is received in the aircraft's cockpit is sent to the FERMONT 10 for digital processing, and eventual retransmission to a ground base receivers.

All commercial and some private, and military aircraft are equipped with a device called the "flight recorder". In the case of a crash these recorded activities are analyzed to determine if the record shows any abnormal flight activity that in turn might be an indicator(s) as to why the plane crashed.

Flight recorder 60 records its data electronically in a digital format, or converts the data to digital form, and interfaces with the FERMONT unit 10. The digitized flight recorder data is sent to the FERMONT 10 for processing and eventual transmission to ground base receivers as described.

It is advantageous to record other forms of "changing" flight information not provided by the flight recorder or changes in the aircraft's operation environment. A "changing data" system 70 that monitors data as it is recorded and responds to changes in data above a predetermined threshold level is interfaced to the FERMONT unit 10. The data from the device is then digitized, processed and transmitted to any number of ground receiving stations.

Many commercial aircraft are presently equipped with cellular telephones which can be personally used by passengers during the flight. These existing cellular telephone links 100 may be employed by the FERMONT unit 10 to transmit its processed data in digital form from the aircraft to any number of ground based receiving stations, ships at sea, other aircraft, or to any number of communication satellites. The utilization of the existing on board cellular is optional, where as the FERMONT unit may be equipped with a dedicated cellular phone 90 of its own which may be employed in the same manner.

The F.E.R.S employs a sufficient number of internally disposed electronic digital cameras 30 strategically located through out the aircraft passenger cabin, cockpit and cargo compartments to monitor all compartments in the aircraft. Camera models presently exist that are capable of switching from a still frame mode to video mode with sound recording. Consumer cameras are capable of recording digitally up to 92 normal quality pictures or 64 high quality pictures which can be shown on a standard television set or down loaded to a computer and printed on a hard copy. Commercial cameras have virtually unlimited image storage capacity. The numerous images produced by the F.E.R.S. are transmitted to the FERMONT unit 10 for processing and eventual transmission from the aircraft.

The External cameras 20 of the F.E.R.S. operate exactly as the system's internal cameras, except that they must be protected from any exposure to any extreme external temperature and weather conditions that might impair their intended function.

Examples of cameras of the type mentioned are the Ricoh multi-media digital cameras, Models RDC-1 and RDC-2, that store compressed visual images and sound. Image and sound data can be sent via standard data communications modems for display and/or storage to any point on the globe. These cameras are capable of continuous image recording and can record still images as well.

Special function cameras and other data acquisition devices may also be used. For example, cameras with filters that sense only certain types of images, e.g. infrared images, may be used. Such cameras mounted on the exterior of the aircraft would sense over-heating and pinpoint the area of incipient malfunction or fire, as the case may be. Gas compositions can be determined using absorption sensing cameras. These cameras can also be used to monitor engine performance and problems in engine performance. All of this data, i.e., temperature sensor data, etc., can be acquired and stored for analysis if an accident occurs.

Positional data using the G.P.S.S. systems can be very accurate. This data being stored in ground storage stations can be monitored in real time or only during an Alert/Alarm situation by aircraft controllers or monitors. If a crash occurs, or seems imminent, aid can be sent to the crash scene even before the crash occurs or immediately after the crash.

In the preferred embodiment of the present invention, the FERMONT unit 10 comprises a large, highly stable, non-volatile memory of any of several types available, e.g. magnetic, tape, disk, electrostatic, etc., into which all data from all sources are fed and from which data is withdrawn for processing, monitoring and transmission to ground receiving stations. In this embodiment, the images and audio data from all cameras are stored. Upon being transmitted to a ground receiving station, and verification of accurate receipt thereof, those portions of reusable memory can be cleared and used again. If a laser generated memory device, e.g. a CD-ROM, is used, the data is permanently stored on the compact disk, which may be permanently archived if desired.

The FERMONT unit 10 and its multiple functions are the central core of the F.E.R.S. Essentially the FERMONT 10 is a custom designed and custom programmed computer. The FERMONT unit 10 is controllable by a pre-set program, manually, or according to the program subject to manual over-ride, and performs the following functions:

Start up and shut down.

The FERMONT unit 10 can be turned on, or turned off automatically, based on flight start or end indications, manually turned on or off by aircraft crew, or turned on or off by a ground control electronic signal. In a preferred embodiment, the F.E.R.S. is activated by turning on the FERMONT unit 10 when the aircraft engines are started and continues to operate until the aircraft has landed or until the aircraft engines are shut down. Upon conclusion of a flight, the data in the FERMONT unit 10 may be transferred to a permanent storage medium, such as a CD-ROM, or, depending on the FERMONT 10 storage medium, erased and reused. Accidental erasure of the data may be prevented if an Alert/Alarm condition occurs by requiring a password for such erasure.

Reception from multiple data source.

The FERMONT unit 10 will accept all data originating from all data acquisition and communications modules of the system. The FERMONT 10 uses known communication systems and protocols as a means of transmitting its data off of the aircraft, either directly or indirectly to any number and type of receiving stations. Telemetry communications, e.g., CL1, CL2, CL3, CL6 and CL7, with satellites and ground stations and either dedicated or consumer cellular telephone links may, for example, be used. F.E.R.S. data transmitted can be routed through satellite communication links to any type of receiving station.

Processing of data from multiple data sources.

The FERMONT 10 compresses all digital data it receives from all its sources and sensors and transmits the data off of the aircraft as described. An example of digital compression is described by way of illustration. If a still digital image of a particular scene is taken once (1st shot) and then taken again (2nd shot), only the digitized data that represents any changes in scene taken by the second shot are recorded and in the case of the F.E.R.S. transmitted off of the aircraft.

All F.E.R.S. data is transmitted from the aircraft in the form of a singular, or in the form of multiple "data streams". All F.E.R.S. data streams can be monitored by the FERMONT unit 10 for violations of data stream high and low "thresholds." If a data stream is suddenly increased or deceased by the fact that one or more of the F.E.R.S. cameras or sensors has sent an increased or a decreased amount of data not considered to be a normal flow of data from that particular source or sensor, the FERMONT unit 10 will react to begin recording pertinent data and/or images. For example, the FERMONT 10 unit will switch some or all cameras from their still frame mode to their video and sound modes. This video and sound data will then be compressed by the FERMONT unit and transmitted from the aircraft to any type of F.E.R.S. receiving station. This type of mode change and type of transmission is called an "Alert/Alarm" transmission.

The F.E.R.S. data streams can be transmitted in several different modes. The data streams may be continuously fed off of the aircraft from the beginning of the aircraft's flight to the end of the flight, during normal conditions when all data is between the alert thresholds, or only during an Alert/Alarm situation.

All F.E.R.S. data streams originating from any particular aircraft can be encoded with the aircraft's personal identification number from data stored in the F.E.R.S. when the system components are installed in the particular aircraft. This permits data from many aircraft to be stored in the same storage system and permits data for any particular aircraft to be extracted at will. Thus, the entire flight history of an aircraft can be stored and retrieved easily and quickly, if desired. The stored data can be passed to any number of computers, thereby permitting any number of specialists to extract and analyzed the data. All members of a team assigned to investigate an aircraft accident, for example, could have access to all flight event data. F.E.R.S. receiving stations use a computer to descramble the data streams and separate the data that came from any one of the F.E.R.S. cameras or sensors. Thus, the internal and external images plus accompanying sounds can be thoroughly analyzed. The F.E.R.S. data streams will all contain, for example, the time of event, longitude and latitude of the event, altitude of the aircraft at the time of the event, all flight recorder data during the event, and images of the interior compartments and external components of the aircraft. Because F.E.R.S. data is digitized it can be sent over phone lines to any location in the world for special analysis and by way of high speed communications to aircraft controlling installations for real time monitoring as the aircraft approaches an airport and/or if unusual events have been reported.

Self-diagnostic systems are included in the FERMONT 10 that give an Alert/Alarm signal if any of the FERMONT functions are not being accurately performed.

It will be apparent from the foregoing that the functions and functional relationships between the modules of the FERMONT unit are very important, the exact manner in which the modules are assembled and the exact nature of the modules are not critical to the invention; indeed, one of the advantages of the invention is that commercial off-the-shelf modules may be used.

Figure 3:
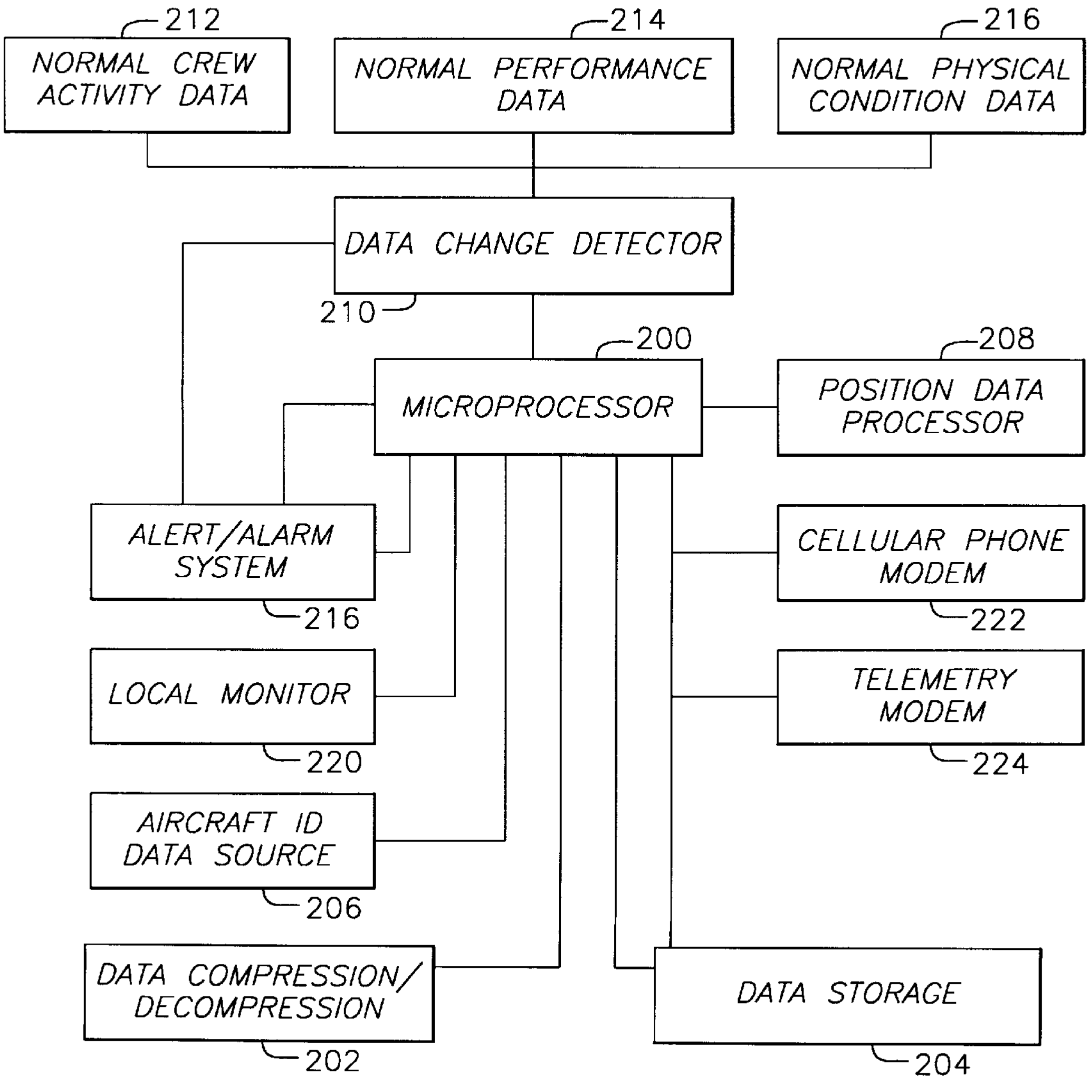
FIG. 3 is a functional block diagram showing the functional units of the FERMONT unit of the invention, numbering of the communication lines being omitted in the interest of clarity and ease of understanding.

Without limiting the scope of the invention thereto, a preferred functional block diagram of the present invention is shown in FIG. 3, to which reference is now made.

Central to the operation of the FERMONT unit 10 is a microprocessor 200. As in any digital processing system, a single multiple function microprocessor circuit may be used or the microprocessor 200 may comprise several interconnected microprocessor circuit. The FERMONT unit 10 preferably includes a data compression/decompression system 202 which exchanges data with the microprocessor 200 by way of communication lines shown but not numbered. The data compression/decompression system 202 also sends compressed, or uncompressed, data to a data storage unit 204 and receives such data for decompression and/or transmission to the microprocessor 200. Aircraft ID data source 206 provides aircraft identifier data to the microprocessor 200 and a position data processor 208 provides positional data from a G.N.S.S. and from other sources, e.g. celestial navigation, to the microprocessor 200. The microprocessor 200 also receives data from a data change detector 210. In a preferred embodiment of the present invention, the data change detector 210 transmits a complete set of data defining all initial parameters and thereafter transmits only changes in the initial parameters. However, complete data may be transmitted continuously. The data change detector 210 receives data directly from the data sources, e.g. the cameras, flight recorder, etc., which is sent to the normal crew activity data generator 212, normal performance data generator 214 and normal physical condition data generator 216 which stores or generates normal data parameters and threshold levels for abnormal data. These normal data parameters are compared in the data change detector 210 with actual data on a continuous basis. If actual data falls outside the normal data parameters, alert or alarm data are sent to an alert/alarm system and to the microprocessor 200. The alert/alarm system 216 generates a data signal for the microprocessor 200 and gives an audio, visual or instrumental alert or warning to the crew.

The crew can follow all parameters monitored by the F.E.R.S. by a local monitor 220 which may include video displays as will as conventional data displays.

Data is continuously transmitted to the ground receiving stations via a cellular phone modem 222 and/or a telemetry modem 224 that processes data directly from the microprocessor 200 and/or from data storage 204 upon command of the microprocessor 200 and transmits the data as previously described. Positional data is transmitted substantially continuously, i.e. on truly continuous or at frequent intervals to the ground receiving stations to assure that the location of the aircraft can be determined at any time. Crew activity, performance and physical condition data may also be transmitted substantially continuously or only upon occurrence of an alert or alarm condition.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A flight event record system, comprising:

a global positioning satellite system;

an aircraft having a global positioning satellite system receiver/transmitter in communication with the global positioning satellite system for generating positioning data defining the geographical position of said aircraft, and a flight event record monitor unit for monitoring in-flight event data and transmitting said in-flight event data, said positioning data and data uniquely identifying said aircraft only if a change in the in-flight event data exceeds a threshold;

a ground based data receiving station in communication with the flight event record monitor unit for receiving the transmitted data from said aircraft; and a recording station in communication with said ground based data receiving station for storing said transmitted data at least until said aircraft has completed its flight.

2. The system of claim 1 further comprising a real time monitor for monitoring in real time the transmitted data from the flight event record monitor unit on said aircraft.

3. The system of claim 2 further comprising at least one camera positioned to generate images of exterior portions of said aircraft, and wherein said in-flight event data includes said exterior images.

4. The system of claim 2 further comprising at least one camera positioned to generate images of interior portions of said aircraft, and wherein said in-flight event data includes said interior images.

5. The system of claim 4 further comprising at least one camera positioned to generate images of exterior portions of said aircraft, and wherein said in-flight event data further includes said exterior images.

6. The system of claim 1 further comprising at least one camera positioned to generate images of exterior portions of said aircraft, and wherein said in-flight event data includes said exterior images.

7. The system of claim 1 further comprising at least one camera positioned to generate images of interior portions of said aircraft, and wherein said in-flight event data includes said interior images.

8. The system of claim 7 further comprising at least one camera positioned to generate images of exterior portions of said aircraft, and wherein said in-flight event data further includes said exterior images.

9. The system of claim 8 further comprising a real time monitor for monitoring in real time the transmitted data from the flight event record monitor unit on said aircraft.

10. The system of claim 1 further comprising a cellular telephone communication system for transmitting said in-flight event data, said positioning data and said data uniquely identifying said aircraft from the flight event record monitor unit to the around based data receiving station.

11. A method for recording in-flight data from an aircraft, comprising the steps of:

generating, on said aircraft from a global navigational satellite system, positioning data comprising the geographic location of said aircraft;

generating data comprising aircraft performance;

generating image data comprising the physical condition of said aircraft;

transmitting said positioning data, said performance data and said image data to a around based station only if a change in either the performance data or the image data exceeds a threshold; and storing said transmitted data at said ground based station at least until said aircraft has completed its flight.

12. The method of claim 11 further comprising the step of monitoring on the ground in real time said transmitted data received from said aircraft.

13. A method for recording in-flight data from an aircraft, comprising the steps of:

generating, on said aircraft from a global navigational satellite system, positioning data comprising the geographic location of said aircraft;

generating aircraft performance data;

generating image data comprising the physical condition of said aircraft;

generating data comprising the activity of the crew of said aircraft;

establishing a normal operating data range for said aircraft performance data, said physical condition data and said crew activity data;

generating an alert signal in response to at least one of said aircraft performance data, physical condition data or crew activity data being outside said normal operating data range; and transmitting said aircraft performance data, said physical condition data and said crew activity data to a ground based data receiving station only if the alert signal is generated and storing the transmitted data at said ground based data receiving station at least until said aircraft has completed its flight.

14. The method of claim 13 further comprising the step of monitoring on the ground in real time said transmitted data received from said aircraft.

15. A method for recording in-flight data from an aircraft comprising:

(a) substantially continuously generating on said aircraft from a global navigational satellite system data defining the geographic location of said aircraft and transmitting said geographic location data to a ground based data receiving and storage installation;

(b) substantially continuously generating data defining performance of said aircraft;

(c) substantially continuously generating image data defining the physical condition of said aircraft;

(d) substantially continuously generating data defining the activity of the crew of said aircraft;

(e) establishing a normal operating data range for said performance data, physical condition data and crew activity data;

(f) generating alert signal data in response to there being generated either performance data, physical condition data or crew activity data outside said normal operating data range; and (g) transmitting in response to the generation of said alert signal said performance data, physical condition data, alert signal data, and crew activity data to a ground based data receiving and storage installation and storing the aforesaid data at said ground based storage installation at least until said aircraft has completed the flight with respect to which such data is generated.

16. The method of claim 15 further comprising the step of monitoring on the ground in real time said data received from said aircraft.

17. A flight event recorder for an aircraft, comprising:

a position data processor for generating position data defining the geographical position of said aircraft;

an aircraft identifier data source for generating data uniquely identifying said aircraft;

a performance data generator for generating data defining the performance of said aircraft;

a physical condition data generator for generating data defining the physical condition of said aircraft;

a crew activity data generator for generating data defining the activity of the crew of said aircraft;

a data chance detector for defining a normal data range for each of said performance data, said physical condition data and said crew activity data and for generating an alert signal if any one of said performance data, said physical condition data or said crew activity data falls outside its respective normal data range;

a transmitter for transmitting from said aircraft in response to said alert signal said position data, said aircraft identifier data, said performance data, said physical condition data and said crew activity data.

* * * * *